US007184091B2

(12) United States Patent
Matsuda et al.

(10) Patent No.: US 7,184,091 B2
(45) Date of Patent: Feb. 27, 2007

(54) METHOD FOR CONNECTING SPLIT IMAGES AND IMAGE SHOOTING APPARATUS

(75) Inventors: Shinya Matsuda, Takarazuka (JP); Takashi Matsuo, Itami (JP); Kentaro Iida, Ikoma (JP); Kazuhiro Shibatani, Sakai (JP)

(73) Assignee: Minolta Co., Ltd., Osaka (JP)

( * ) Notice: Subject to any disclaimer, the term of this patent is extended or adjusted under 35 U.S.C. 154(b) by 598 days.

(21) Appl. No.: 09/981,700

(22) Filed: Oct. 17, 2001

(65) Prior Publication Data

US 2002/0054217 A1 May 9, 2002

(30) Foreign Application Priority Data

Nov. 7, 2000 (JP) ............................. 2000-339448

(51) Int. Cl.
*H04N 11/02* (2006.01)
(52) U.S. Cl. ..................................... 348/369
(58) Field of Classification Search ................ 348/344, 348/369, 219.1; 358/450; 382/284, 294
See application file for complete search history.

(56) References Cited

U.S. PATENT DOCUMENTS

| 5,016,109 A | * | 5/1991 | Gaylord ..................... 348/218.1 |
| 5,515,181 A | * | 5/1996 | Iyoda et al. ................. 358/450 |
| 5,686,960 A | * | 11/1997 | Sussman et al. ............. 382/284 |
| 6,005,682 A | * | 12/1999 | Wu et al. .................... 358/474 |
| 6,104,840 A | * | 8/2000 | Ejiri et al. ................... 382/284 |
| 6,304,284 B1 | * | 10/2001 | Dunton et al. ................. 348/36 |
| 6,389,179 B1 | * | 5/2002 | Katayama et al. ........... 382/284 |
| 6,459,819 B1 | * | 10/2002 | Nakao ......................... 382/284 |
| 6,512,539 B1 | * | 1/2003 | Dance et al. ................ 348/203 |
| 6,670,991 B1 | * | 12/2003 | Takagi et al. ................ 348/349 |
| 6,727,954 B1 | * | 4/2004 | Okada et al. ................ 348/369 |
| 6,771,396 B1 | * | 8/2004 | Cheatle et al. .............. 358/450 |
| 6,891,643 B1 | * | 5/2005 | Matsuda ...................... 382/287 |
| 2001/0015830 A1 | * | 8/2001 | Matsuda ...................... 358/474 |
| 2001/0031099 A1 | * | 10/2001 | Kondo et al. ................ 348/241 |
| 2005/0041113 A1 | * | 2/2005 | Nayar et al. ................ 348/219.1 |

FOREIGN PATENT DOCUMENTS

| JP | 62204380 A | * | 9/1987 |
| JP | 05-054753 B | | 8/1993 |
| JP | 07-007656 A | | 1/1995 |
| JP | 07-222045 A | | 8/1995 |
| JP | 10-164413 A | | 6/1998 |
| JP | 10-178535 A | | 6/1998 |
| JP | 10-210272 A | | 8/1998 |
| JP | 2000-201296 A | | 7/2000 |

* cited by examiner

*Primary Examiner*—Vivek Srivastava
*Assistant Examiner*—Jason Whipkey
(74) *Attorney, Agent, or Firm*—Sidley Austin LLP

(57) ABSTRACT

An image shooting apparatus capable of accurately connecting split images while avoiding increase in the size of the apparatus is described. The stop positions of an image forming portion 10 is detected on the order equal to the pixel pitch, the shift amounts of the shot split images are obtained from the shift amounts of the stop positions of the image forming portion 10, and for each split image, the address is converted to a normal address based on the shift amount.

20 Claims, 16 Drawing Sheets

1st SHOT IMAGE    2nd SHOT IMAGE

1st IMAGE

2nd IMAGE

⋮

⋮

METHOD FOR CONNECTING SPLIT IMAGES AND IMAGE SHOOTING APPARATUS

RELATED APPLICATION

This application is based on application No. 2000-339448 filed in Japan, the entire content of which is hereby incorporated by reference.

BACKGROUND OF THE INVENTION

1. Field of the Invention

The present invention relates to an image shooting apparatus that shoots light images of a plurality of split parts of a subject and connects the shot images of the split parts to obtain an image of the entire subject, a method for connecting the shot images, a computer-readable recording medium on which an image processing program is recorded, and an image shooting system.

2. Description of the Related Art

Conventionally, an image shooting apparatus has been widely known that has the function of, to obtain a high-resolution still image, shooting light images of a plurality of split parts of a subject by use of an image shooting sensor and an image shooting lens system and connecting the obtained split images into an image of the entire subject.

There are various methods for obtaining one image by connecting images obtained by split image shooting. First, a method is considered that images obtained by shooting split parts are pasted together at corresponding addresses on the images. According to this method, some parts of the obtained image are missing unless the image shooting positions when the spit images are shot are adjusted with an accuracy in units of pixels.

Secondly, a method is present that split images are shot so as to include overlapping areas and the split images are matched at the overlapping areas to thereby paste the split images together in an appropriate positional relationship. According to this method, since it is necessary to search the entire overlapping areas of the split images for corresponding points after the split images are shot, image processing for connecting the split images takes time.

Thirdly, a method is known that a correction pattern as a correction reference chart is shot together with the original and the positions of the split images are aligned with the shot correction pattern as the reference. According to this method, since it is necessary to place on the original table the correction reference chart where the correction pattern is drawn, the apparatus increases in size. In addition, when it is impossible to shoot the correction pattern together with the original because the original has a size that covers the entire scale, it is impossible to correctly paste the split images together.

SUMMARY OF THE INVENTION

An object of the present invention is to obtain an image of the entire subject from split images with high accuracy.

Another object of the present invention is to obtain at high speed an image of the entire subject formed by pasting split images together with high accuracy.

Still another object of the present invention is to avoid increase in the size of an apparatus that shoots split images and pastes together the split images to obtain an image of the entire subject.

These and other objects are attained by a method for shooting an original by an image shooting apparatus having a photoelectrically converting device and a scanning mechanism, said method comprising the steps of: directing one by one split images of the original including overlapping areas to the photoelectrically converting device by the scanning mechanism; shooting the directed split images by the photoelectrically converting device; detecting a degree of operation of the scanning mechanism every directing by the scanning mechanism; extracting an effective image from each of the split images based on the detected degree; and connecting the extracted effective images in order to complete an image of the original.

Moreover, the above-mentioned objects of the present invention are attained by a method for connecting split images of an original to obtain an image of the entire original, said method comprising the steps of: obtaining split images of the original one by one by an operation to change a part of the original which part is directed to an image shooting device; detecting a degree of the above-described operation; and connecting the split images in positions in the split images based on the detected degree.

Moreover, the above-mentioned objects of the present invention are attained by an image shooting apparatus comprising: an image shooting device that shoots an optical image of an original; a directing member that directs split images of the optical image of the original to the image shooting apparatus; a mechanism that, in order to scan the entire original, changes a part of the original which part is directed to the image shooting apparatus by moving at least the directing member; a detector that detects, every time the mechanism moves the directing member, a degree of the moving; a processor that connects the split images based on the detected degree of the moving to thereby complete an image of the entire original.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

Preferred embodiments of the present invention will be made apparent with reference to the drawings.

Figure 1:
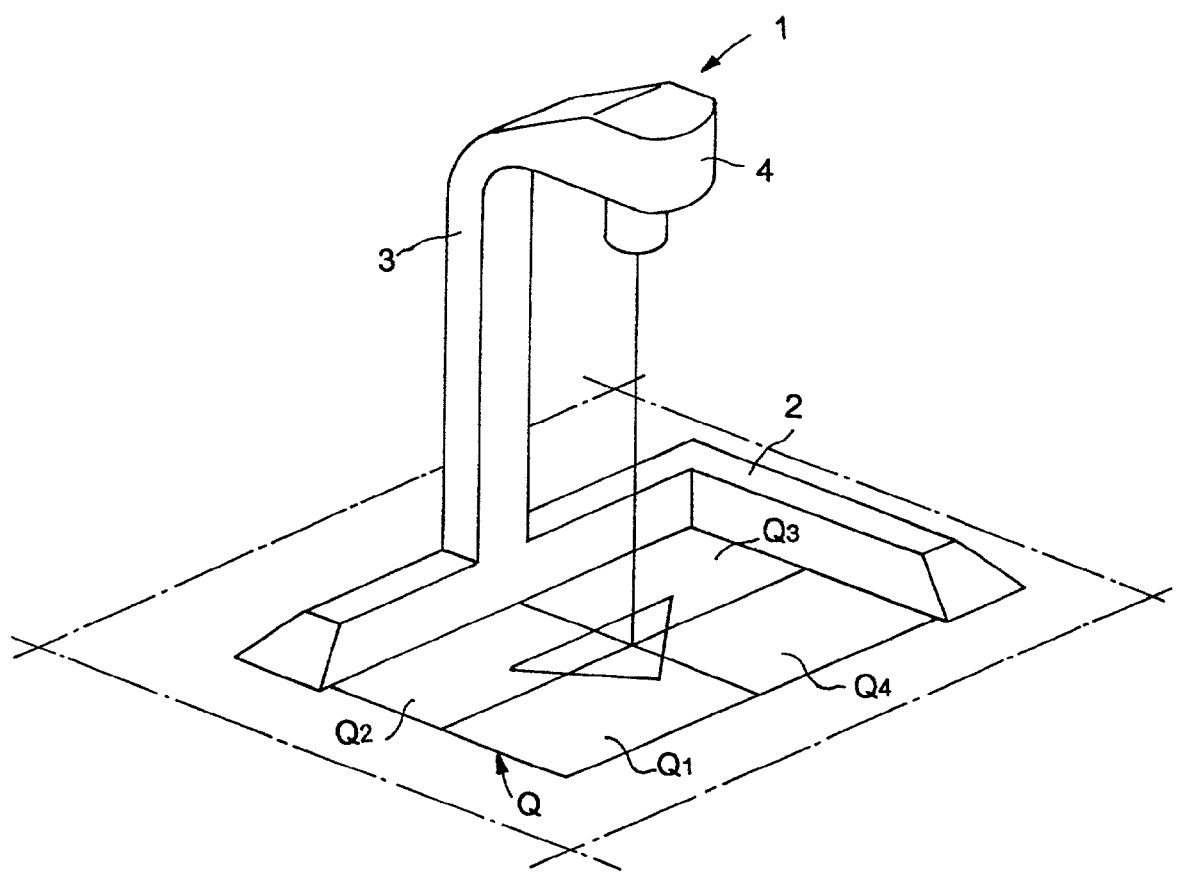
FIG. 1 is a general perspective view of an image shooting apparatus according to a first embodiment.
Figure 2A:
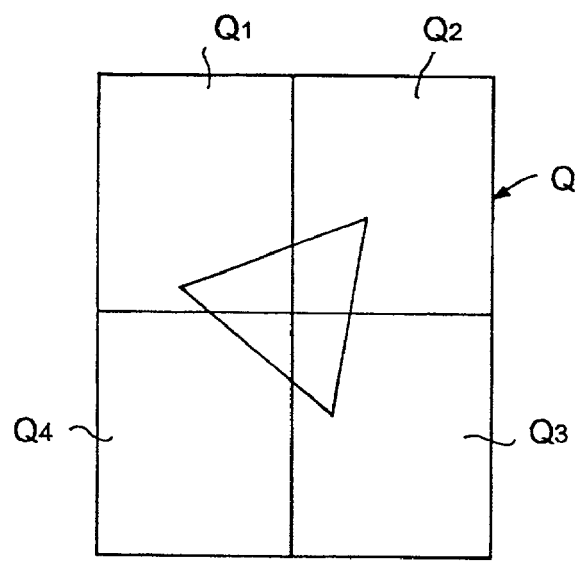
FIGS. 2(a) and 2(b) are views showing an image shooting operation.
Figure 2B:
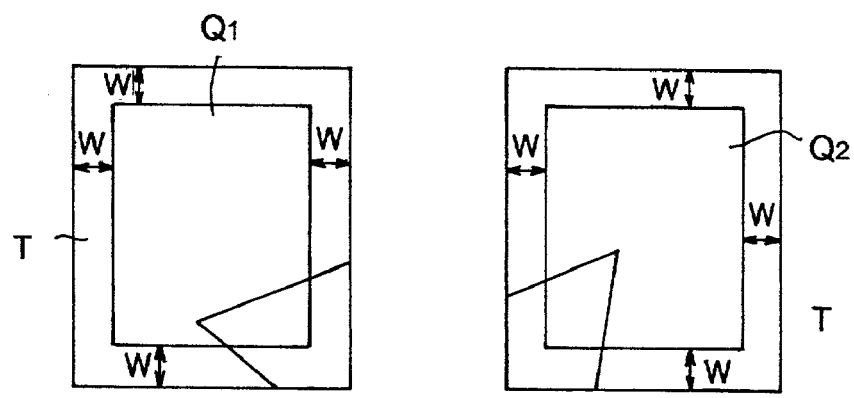
Figure 2B:
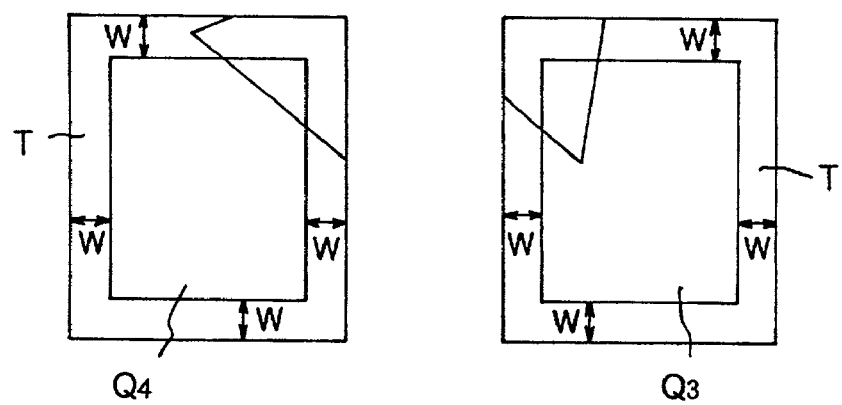

As shown in FIGS. 1 and 2, an image shooting apparatus 1 according to this embodiment has an L-shaped stopper 2 showing the reference positions for placing an original (subject) Q, an arm 3 upwardly protruding from an appropriate position of the stopper 2, and a head 4 provided at the upper end of the arm 3. The image shooting apparatus 1 is structured so as to split the image of the original Q placed along the stopper 2 into two parts in each of the longitudinal and the lateral directions and shoot split images $Q_1$ to $Q_4$ one by one by an image forming portion 10, an image shooting portion 20 and a scanning portion 30 provided on the head 4 and described later, and then, connect shot split images $Q_1'$ to $Q_4'$ into one image of the entire original Q.

In doing this, in order that no parts of the split images $Q_1'$ to $Q_4'$ are missing even when the split images $Q_1$ to $Q_4$ are shot being shifted, the image shooting apparatus 1 shoots the split images $Q_1$ to $Q_4$ so that an extra area with a predetermined width 2w is included in each of the longitudinal and the lateral directions (hereinafter, this extra area will be referred to as overlapping area T). Consequently, unless an error occurs in the image shooting operation performed by the image shooting apparatus 1, the split images $Q_1'$ to $Q_4'$ are situated in the center of the corresponding shooting areas as shown in FIG. 2(b) (hereinafter, these positions will be referred to as normal positions). When an error occurs in the image shooting operation, the split images $Q_1'$ to $Q_4'$ shift from the central positions.

Figure 3:
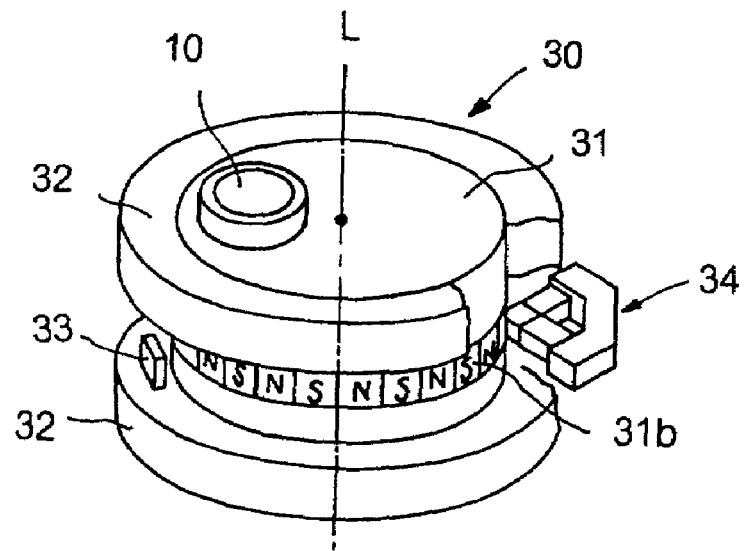
FIG. 3 is a perspective view of an image forming portion and a scanning portion.
Figure 4:
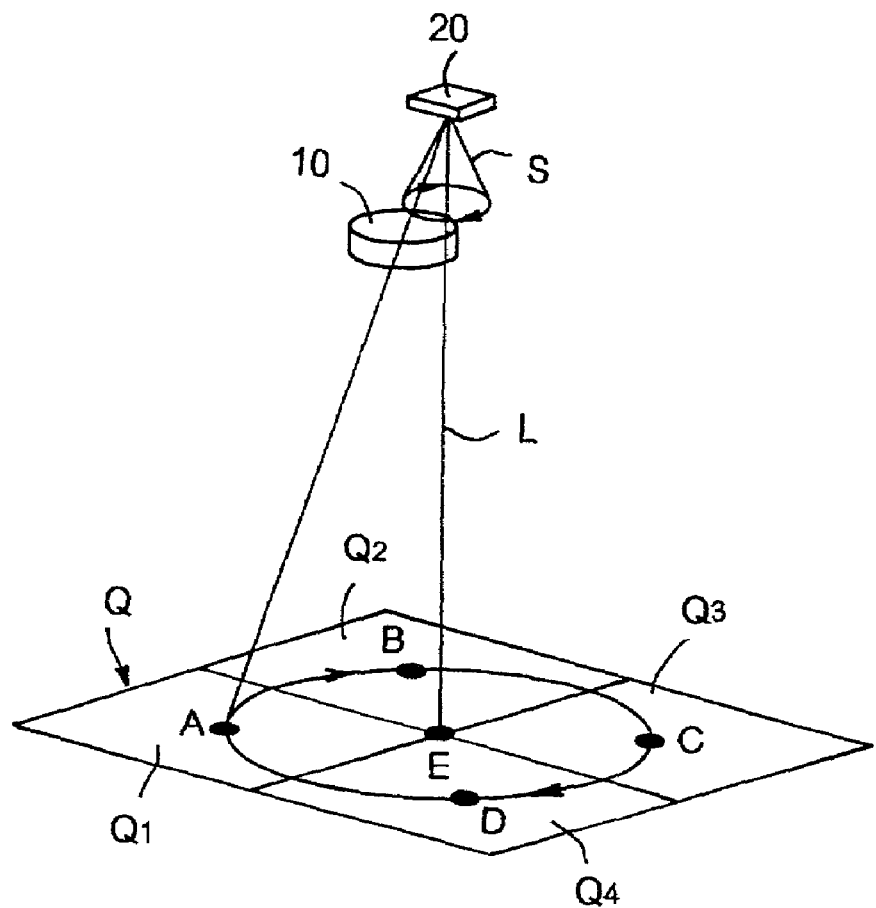
FIG. 4 is an explanatory view showing a positional relationship between the image forming portion and an image shooting portion.

FIG. 3 is a perspective view of the image forming portion 10 and the scanning portion 30 disposed on the head 4. The image forming portion 10 comprising a zoom lens system and a focusing lens system (not shown) forms a light image of the subject Q on the image shooting surface of the image shooting portion 20 disposed above the image forming portion 10 as shown in FIG. 4. The image forming portion 10 are structured so as to change and adjust the shooting magnification and the focus position by the lens systems being driven by a motor 15 (see FIG. 10).

The image shooting portion 20 comprising a CCD (charge-coupled device) color area sensor (hereinafter, abbreviated as CCD) having a rectangular image shooting area photoelectrically converts the light image of the subject Q formed by the image forming portion 10 into an image signal (signal comprising a string of pixel signals light-received at pixels) of color components R (red), G (green) and B (blue). The image shooting portion 20 may comprise a CMOS (complementary metal oxide semiconductor) color area sensor having a rectangular image shooting area.

The scanning portion 30 has a rotor 31, an MR (magne-toresistive) device 33 and an actuator 34. As shown in FIG. 3, the rotor 31 which is a substantially cylindrical member externally fitted with the image forming portion 10 is held on an inner wall (not shown) of the head 4 through bearings 32 so as to be relatively rotatable. In that case, since the image forming portion 10 is fitted in the rotor 31 in a position decentered from the axial center of the rotor 31, the locus of movement of the image forming portion 10 when viewed from the direction of the axial center is circular with the position of the axial center of the rotor 31 as the center, and when the image shooting portion 20 is situated at the vertex of a cone S as shown in FIG. 4, the image forming portion 10 moves on the bottom surface of the cone S. Therefore, using this, the rotor 31 is rotated on an axis L and the image forming portion 10 is caused to perform the image shooting operation at each of the stop positions described later, whereby the split images $Q_1$ to $Q_4$ in different positions can be shot.

The lower part of the surface of the rotor 31 acts as a magnetic field generating portion 31b where south poles and north poles are alternately provided in the circumferential direction with a predetermined pitch. The MR device 33 is attached to an appropriate position on the upper surface of the lower bearing 32. By use of the MR device 33 and the magnetic field generating portion 31b, the angle of rotation of the rotor 31 is detected on the order equal to the pixel pitch of the image shooting portion 20.

Figure 5:
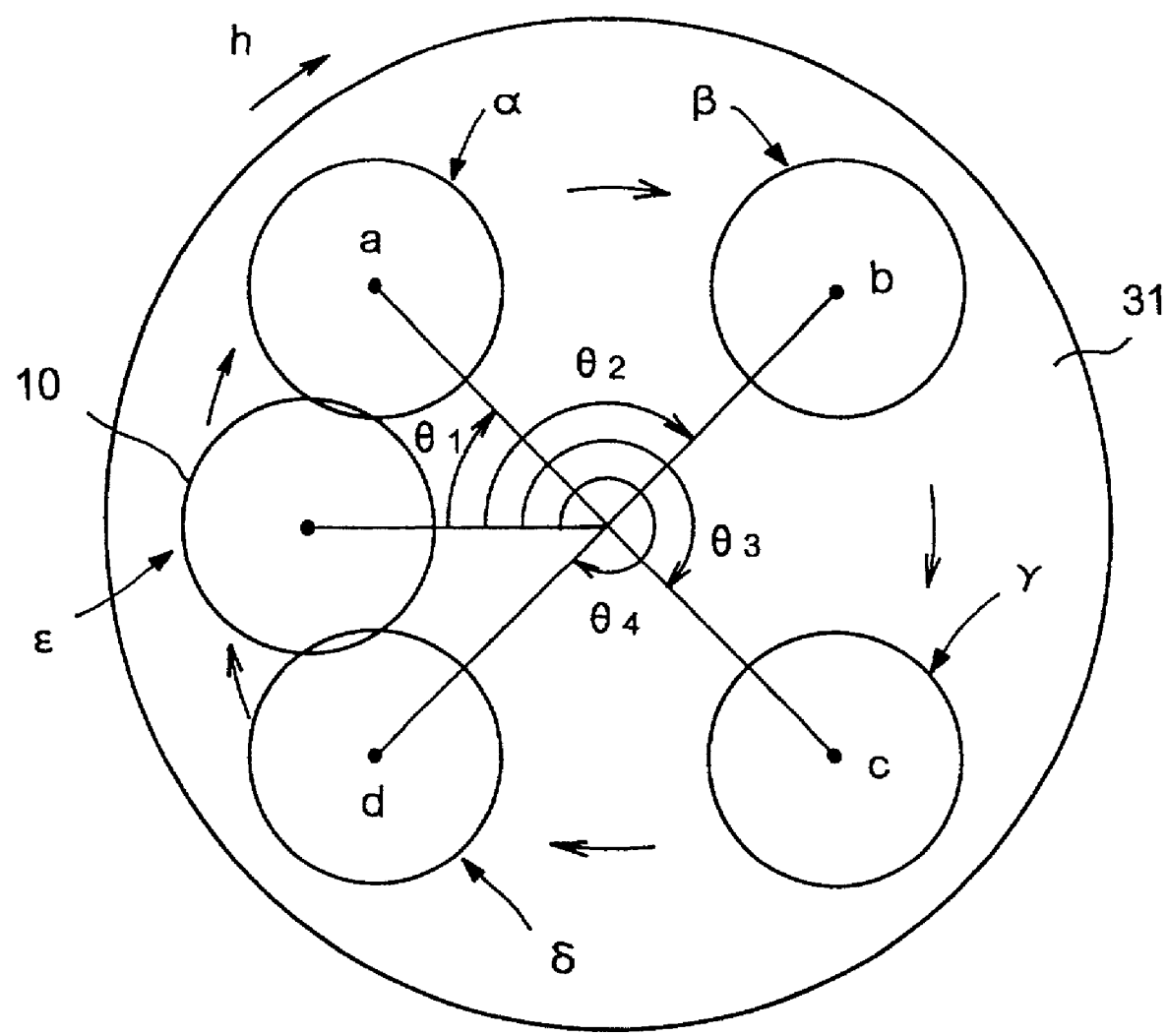
FIG. 5 is an explanatory view showing stop positions ε of a rotor.

At the side of the rotor 31, the actuator 34 that rotates the rotor 31 on the rotation axis L is disposed. When the rotor 31 is rotated by the actuator 34, by the rotation of the magnetic field generating portion 31b, the direction and the density of the magnetic line of force passing through the MR device 33 change in accordance with the magnetic pole of the magnetic field generating portion 31b which magnetic pole is opposed to the MR device 33, so that the electric resistance of the MR device 33 changes. Therefore, the MR device 33 is electrified, change in the voltage across the MR device 33 is detected and the number of magnetic poles passing a neighborhood of the MR device 33 is detected to thereby calculate the angle of rotation of the rotor 31. As shown in FIG. 5, of the positions of the image forming portion 10, a position $\alpha$ is a position when the rotor 31 is rotated by an angle $\theta_1$ from a reference position (initial position) $\epsilon$, a position $\beta$ is a position when the rotor 31 is rotated by an angle $\theta_2$ from the reference position $\epsilon$, a position $\gamma$ is a position when the rotor 31 is rotated by an angle $\theta_3$ from the reference position $\epsilon$, and a position $\delta$ is a position when the rotor 31 is rotated by an angle $\theta_4$ from the reference position $\epsilon$. The image shooting apparatus 1 performs the image shooting operation when the image forming portion 10 reaches the positions $\alpha$ to $\delta$.

Although not shown in detail, the actuator 34 comprises, for example, two piezoelectric devices disposed so as to orthogonal to each other, a chip member provided at the point of intersection of the piezoelectric devices and being in contact with the peripheral surface of the rotor 31, and a base member that secures the piezoelectric devices. By inputting a predetermined sinusoidal signal to the piezoelectric devices, the chip member is caused to make an elliptic motion and by pressing the actuator 34 against the rotor 31 with a predetermined pressure, the rotation of the chip member is transmitted to the rotor 31, thereby rotating the rotor 31.

Figure 6:
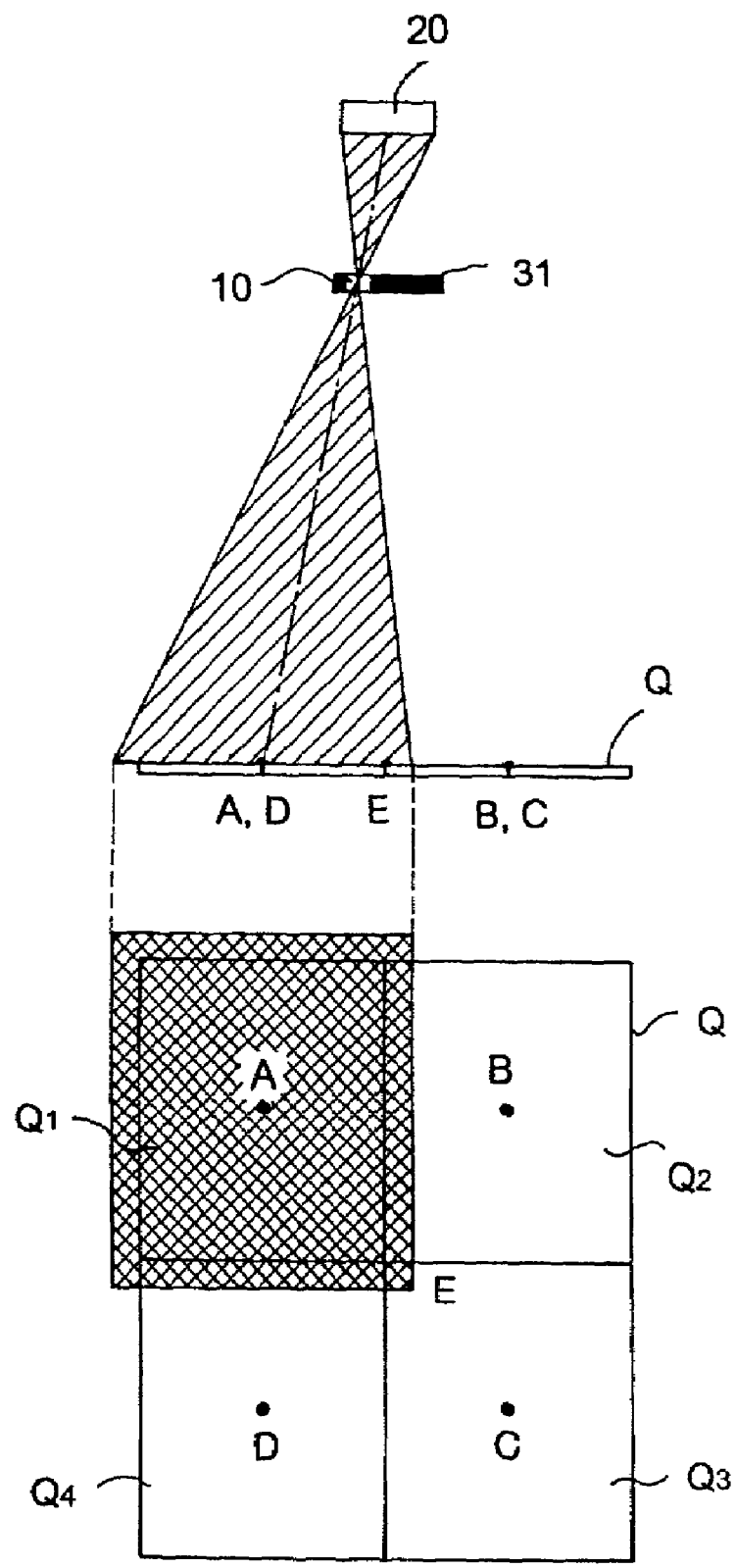
FIG. 6 is an explanatory view showing the image shooting operation performed by the image shooting apparatus.
Figure 7:
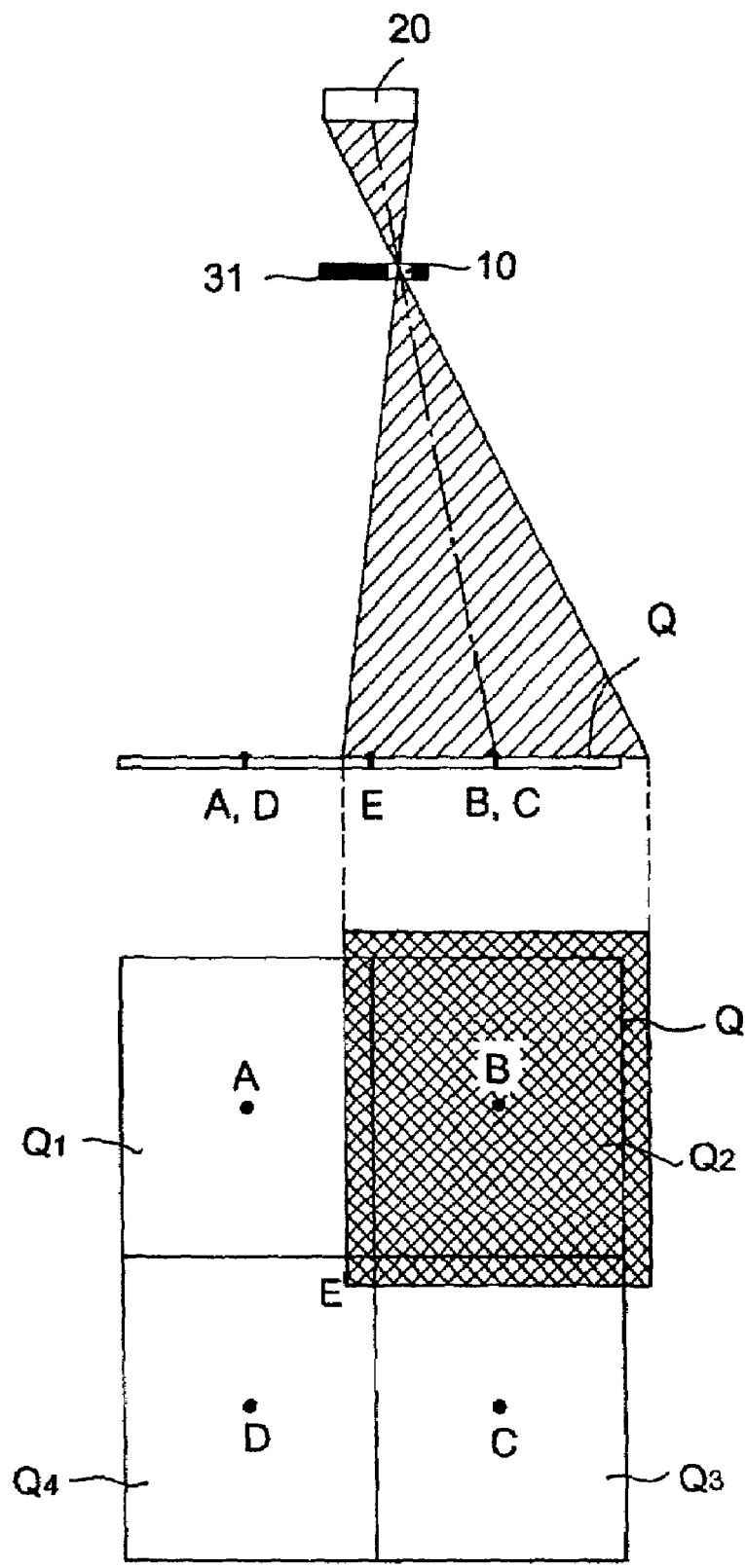
FIG. 7 is also an explanatory view showing the image shooting operation performed by the image shooting apparatus.
Figure 8:
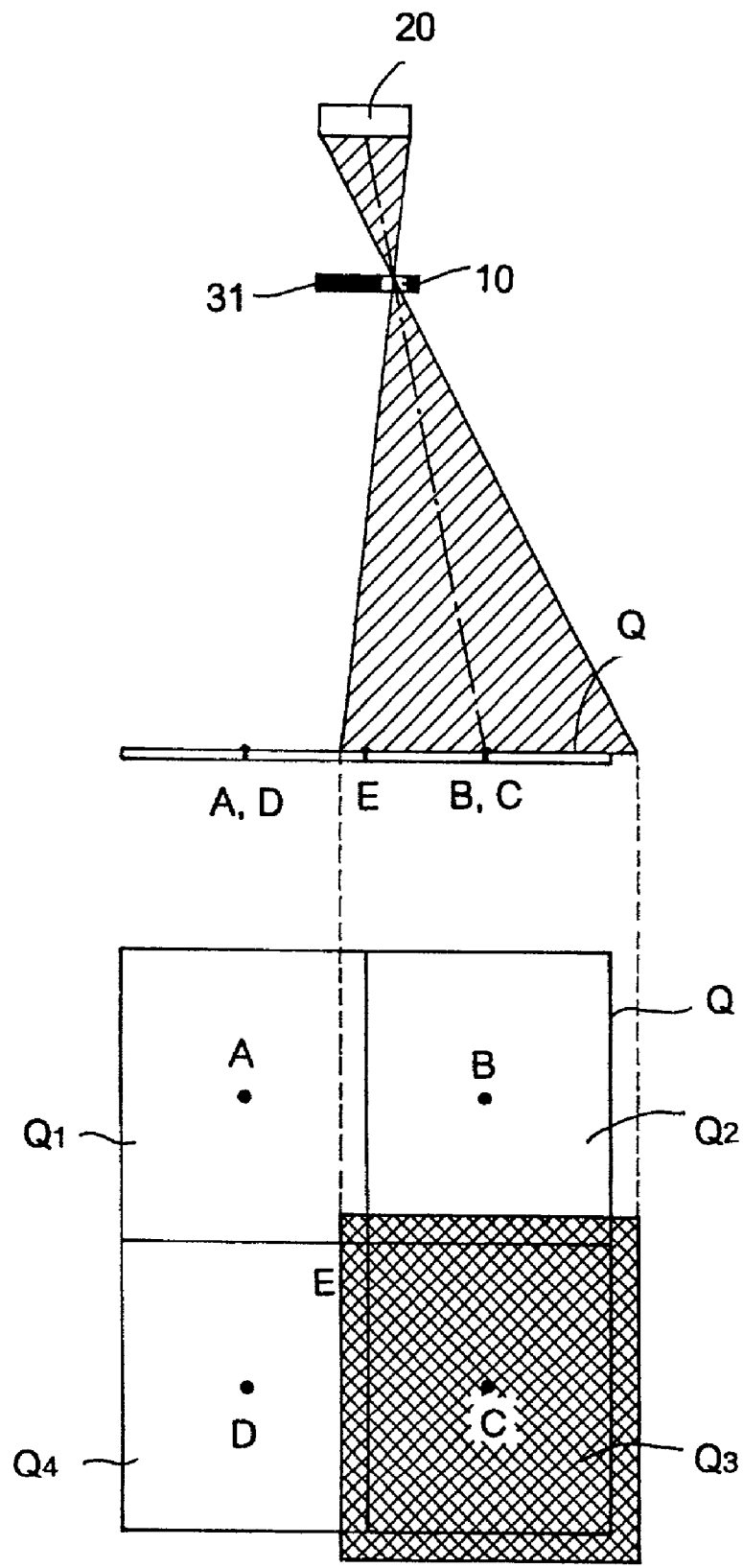
FIG. 8 is also an explanatory view showing the image shooting operation performed by the image shooting apparatus.
Figure 9:
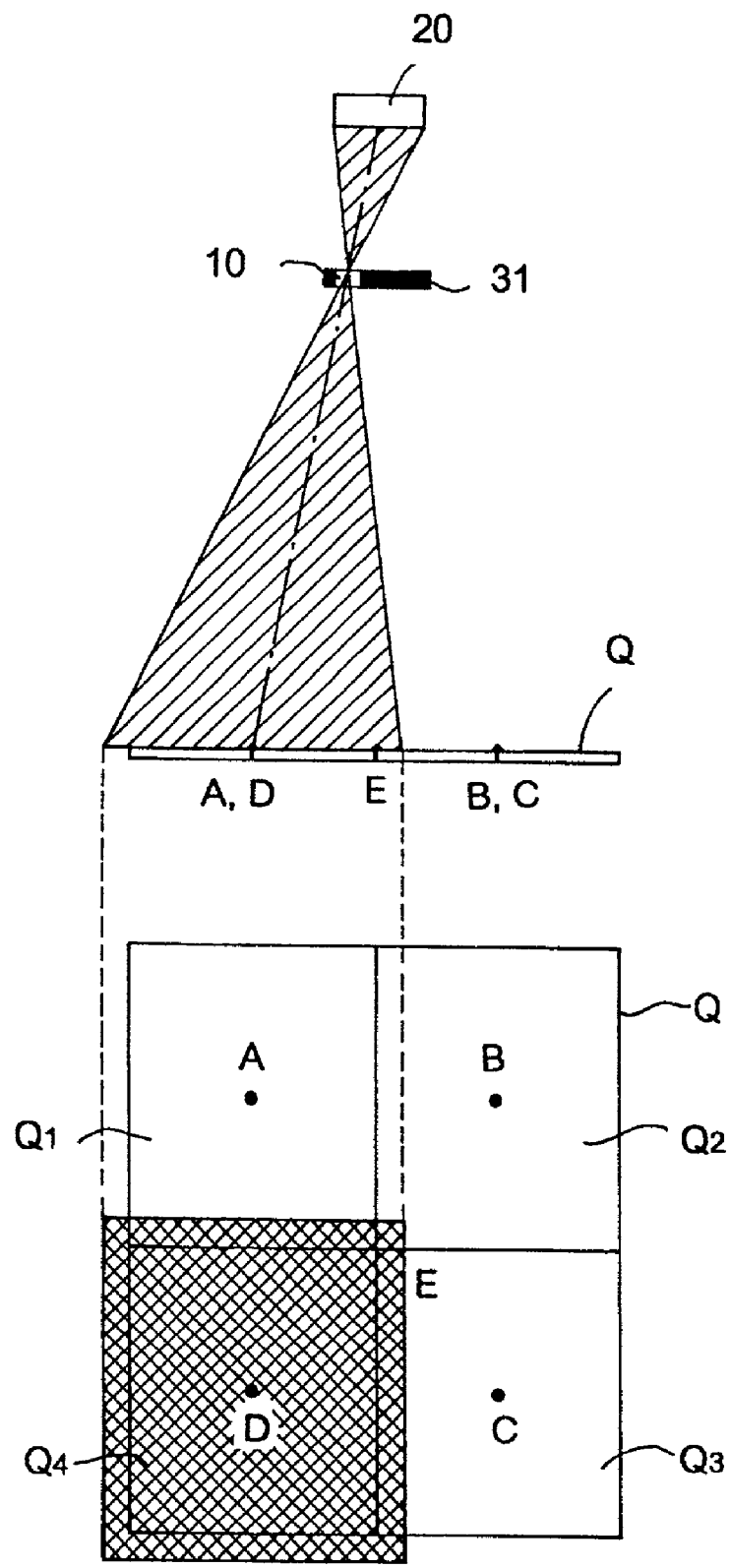
FIG. 9 is also an explanatory view showing the image shooting operation performed by the image shooting apparatus.

Next, the image shooting operation performed by the image shooting apparatus 1 will be described. The shooting magnification of the zoom lens system is set to a predetermined value, and as shown in FIG. 5, the rotor 31 is rotated in the direction of the arrow h by the actuator 34. The angle of rotation from a condition where the image forming portion 10 is situated in the reference position ϵ is detected by use of the magnetic field generating portion 31b and the MR device 33, and when the rotor 31 is rotated by the rotation angle $\theta_1$, the rotor 31 is stopped and the split image $Q_1$ is shot (FIG. 6). Then, the rotor 31 is rotated again, and when the rotor 31 is rotated by the rotation angle $\theta_2$, the rotor 31 is stopped and the split image $Q_2$ is shot (FIG. 7). The rotor 31 is rotated again, and when the rotor 31 is rotated by the rotation angle $\theta_3$, the rotor 31 is stopped and the split image $Q_3$ is shot (FIG. 8). The rotor 31 is rotated again, and when the rotor 31 is rotated by the rotation angle $\theta_4$, the rotor 31 is stopped and the split image $Q_4$ is shot (FIG. 9).

In doing these, as mentioned above, the split images $Q_1$ to $Q_4$ are shot so as to include the predetermined overlapping areas T. The mesh parts in FIGS. 6 to 9 show the regions of the overlapping areas T. The points A, B, C and D are the centers of the split images $Q_1$ to $Q_4$, and are the positions of the optical axis when the split images $Q_1$ to $Q_4$ are shot in the normal positions. In FIG. 5, the points a, b, c and d are the positions of the optical axis when the image forming portion 10 is situated in the positions α to δ.

Figure 10:
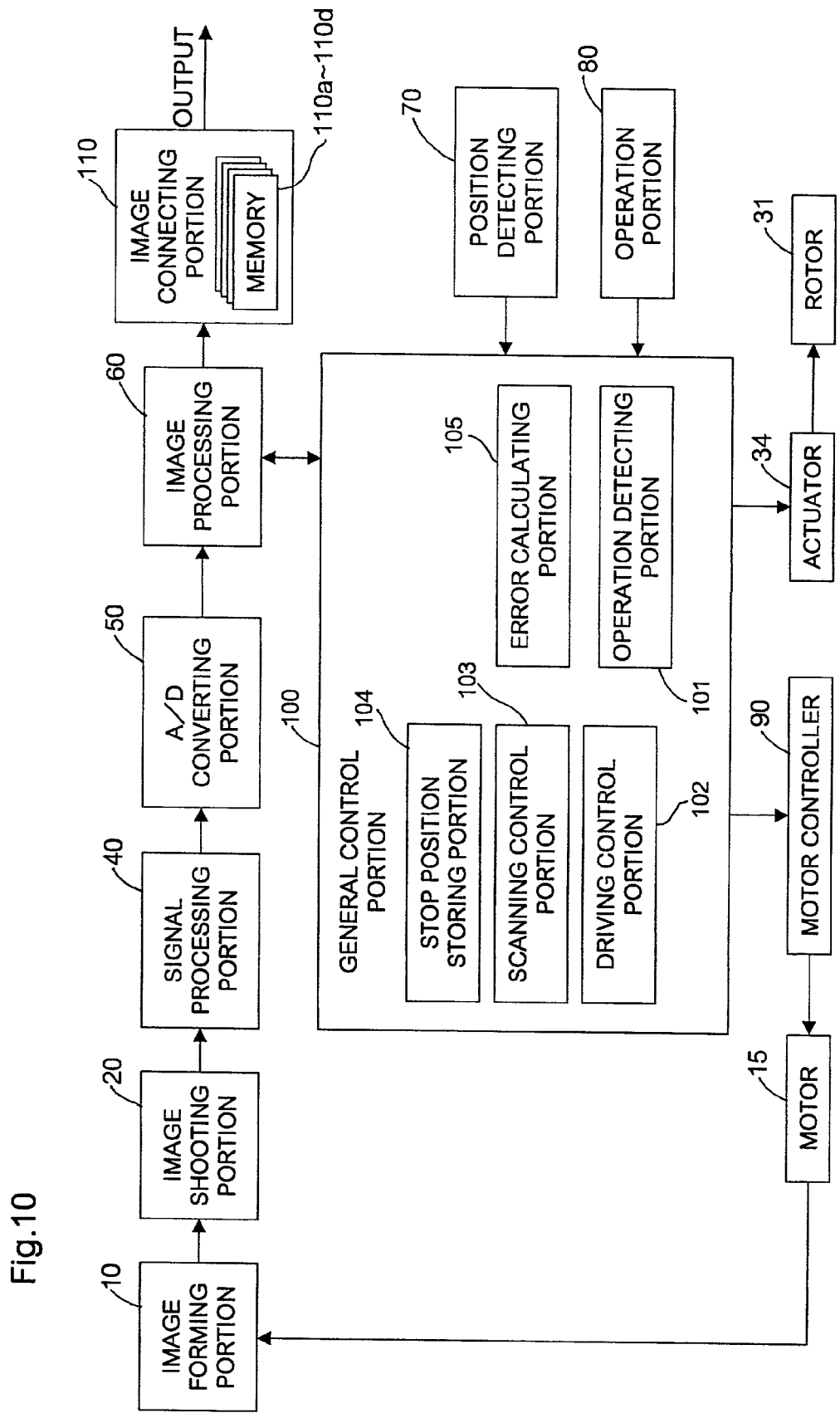
FIG. 10 is a control block diagram of the image shooting apparatus.

Next, a control system of the image shooting apparatus 1 will be described. FIG. 10 is a control block diagram of the image shooting apparatus 1. A signal processing portion 40 performs a predetermined analog signal processing on the image signal (analog signal) output from the image shooting portion 20. The signal processing portion 40 reduces noise of the image signal and adjusts the level of the image signal.

An A/D (analog-to-digital) converting portion 50 converts the pixel outputs (analog signals) of the image signal output from the signal processing portion 40 into digital signals. An image processing portion 60 corrects the black levels of the pixel signals (hereinafter, referred to as pixel data) A/D-converted by the A/D converting portion 50 to a reference black level, converts the levels of the pixel data of the color components R, G and B, and corrects the gamma characteristics of the pixel data. A position detecting portion 70 comprising the magnetic field generating portion 31b and the MR device 33 detects the rotation angle of the rotor 31. An operation portion comprises, for example, a start button for instructing the image shooting apparatus 1 to start shooting. A motor controller 90 controls the driving by the motor 15 that drives the lens systems of the image forming portion 10. A general control portion 100 has an operation detecting portion 101, a driving control portion 102, a scanning control portion 103, a stop position storing portion 104 and an error calculating portion 105.

Figure 11A:
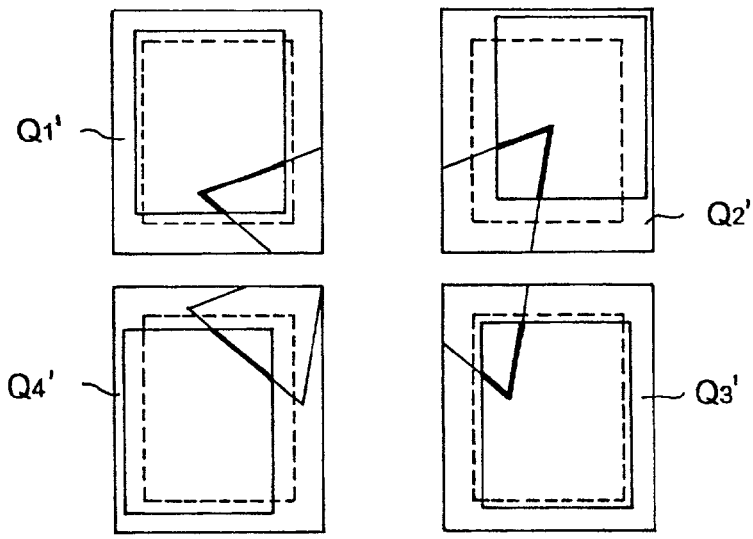
FIGS. 11(a) to 11(c) are views for explaining an image processing performed by the image shooting apparatus according to the first embodiment.

The operation detecting portions 101 detects operations of setting buttons and the like of the operation portion 80. The driving control portion 102 controls the rotation of the motor 15 that drives the lens systems. The scanning control portion 103 controls the operation of the actuator 34 that rotates the rotor 31 so that the image forming portion 10 moves to and stops at each of the positions α to δ. Although it is ideal that the split images $Q_1'$ to $Q_4'$ be shot so as to be situated in the center of the image shooting areas (the dotted lines in FIG. 11(a)) as mentioned above, there are cases where the split images shift from the normal positions as shown by the solid lines in FIG. 11(a) because the position of the image forming portion 10 relative to the position of the image shooting portion 20 shifts due to shifts of the positions of attachment of members and mechanisms provided in the image shooting apparatus 1. The stop position storing portion 104 stores the actual stop position of the image forming portion 10. The error calculating portion 105 calculates how much the actual stop position of the image forming portion 10 stored by the stop position storing portion 104 is shifted from the normal stop position (shift amount).

Figure 12A:
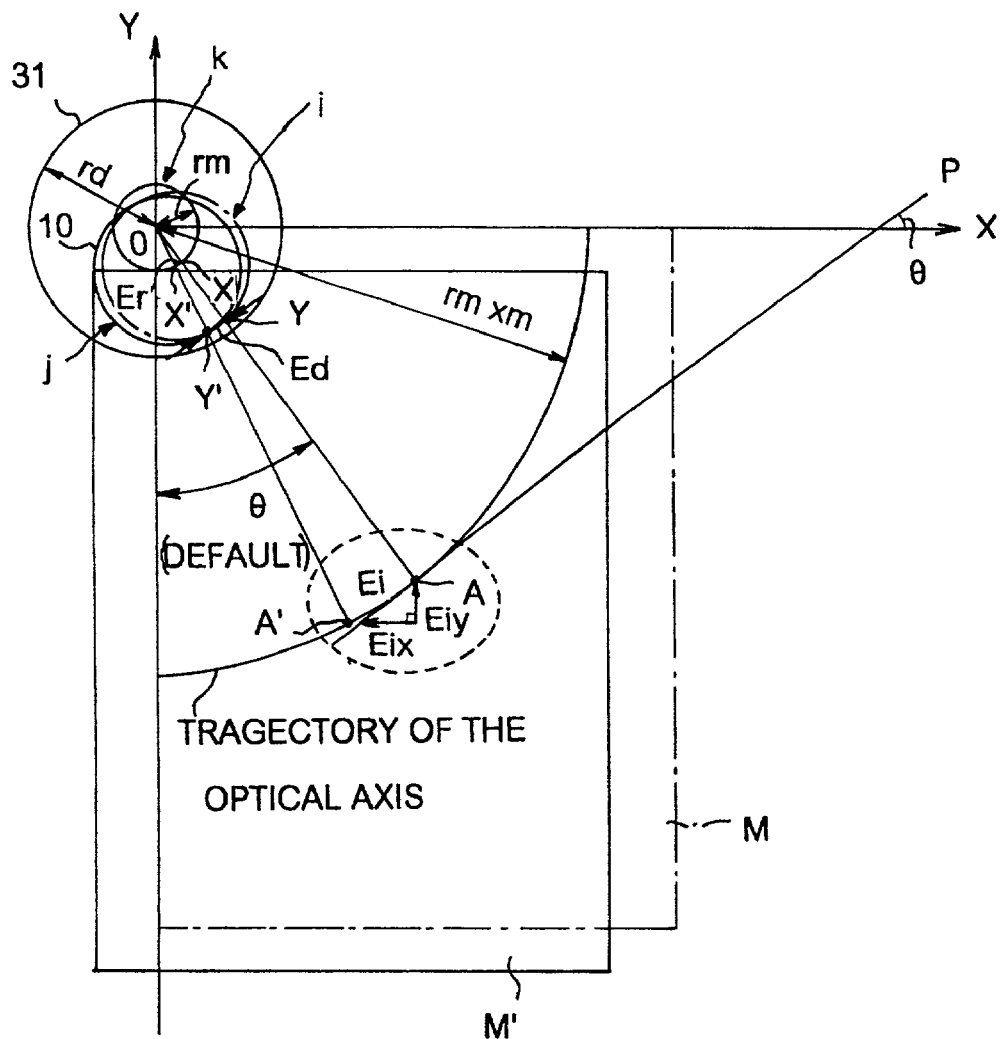
FIGS. 12(a) and 12(b) are explanatory views for obtaining errors of shot images.

FIG. 12 is a view showing a relationship among shifts of parts when the image shooting apparatus 1 is viewed from above. In FIG. 12, the alternate long and short dashed line indicated by the arrow i is a normal stop position of the image forming portion 10. At this time, the optical axis passes through the central point $A_0$ of an image shooting area M, and the image shooting area M is shot. The arrow j indicates a position where the image forming portion 10 stops being shifted from the normal position. At this time, the optical axis passes through a point A' shifted from the central point $A_0$, and an image shooting area M' is shot. The solid line indicated by the arrow k is the locus of movement of the optical axis of the image forming portion 10. The point O is the center of the locus of movement. With the point O as the center, the x-axis is set in the direction of the shorter sides of the image shooting area M and the y-axis is set in the direction of the longer sides of the area M. The radius of the rotor 31 is $r_d$, the radius of gyration of the image forming portion 10 is $r_m$, and the shooting magnification is 1/m (m>1). By the position of the optical axis of the image forming portion 10 being shifted by $E_r$ (between X and X'), an error $E_d$ (between Y and Y') is caused in the value detected by the position detecting portion 70, and the optical axis is shifted by $E_i$ (between A and A') on the original plane.

At this time, since a figure OXX' and a figure OYY' are similar to each other, $$r_m : E_r = r_d : E_d \tag{1}$$

holds, and the position error Er of the optical axis of the image forming portion 10 is $$E_r = E_d \times (r_m/r_d) \tag{2}$$

Likewise, since the figure OXX' and a figure OAA' are similar to each other, $$r_m : E_r = r_m \times m : E_i \tag{3}$$

holds, and the position error $E_i$ of the shot image is $$E_i = E_r \times m = E_d \times m \times (r_m/r_d) \tag{4}$$

Figure 12B:
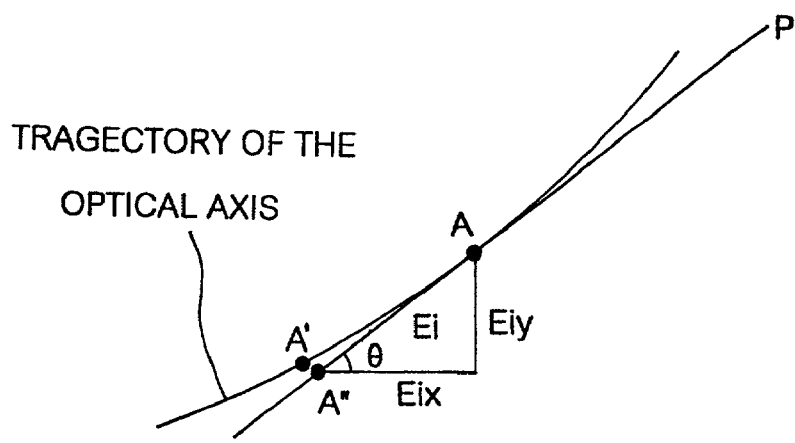

Here, to obtain the component $E_{ix}$ of the position error $E_i$ in the direction of the x-axis and the component $E_{iy}$ thereof in the direction of the y-axis, as shown in FIG. 12(b), the position of the point A' is approximated to the position A" that is in the direction of the tangential line at the point A from the point A and is at a distance $E_i$ from the point A in a leftwardly and downwardly slanting direction, and the angle between the tangential line P and the x-axis is set as an angle θ (the smaller one). The position errors $E_{ix}$ and $E_{iy}$ of the shot image in the directions of the x- and y-axes are $$E_{ix} = E_i \cos\theta = E_d m \cos\theta \times (r_m/r_d) \tag{5}$$

$$E_{iy} = E_i \sin\theta = E_d m \sin\theta \times (r_m/r_d) \tag{6}$$

The error $E_d$ is a detection value, and the reciprocal m of the shooting magnification, the angle θ between the tangential line P and the x-axis, the radius of gyration of the image forming portion 10 and the radius $r_d$ of the rotor 31 are preset values.

The error calculating portion 105 calculates the angle θ, and calculates the position error $E_{ix}$ in the direction of the x-axis and the position error $E_{iy}$ in the direction of the y-axis by substituting the values of Ed, m, θ, $r_m$ and $r_d$ into the computing expressions (5) and (6).

An image connecting portion 110 connects the split images $Q_1'$ to $Q_4'$ shot at the positions α to δ into one image of the entire subject. The image connecting portion 110 has memories 110a to 110d in which image data are stored, and stores the image data of the split images $Q_1'$ to $Q_4'$ shot at the positions α to δ.

Figure 11B:
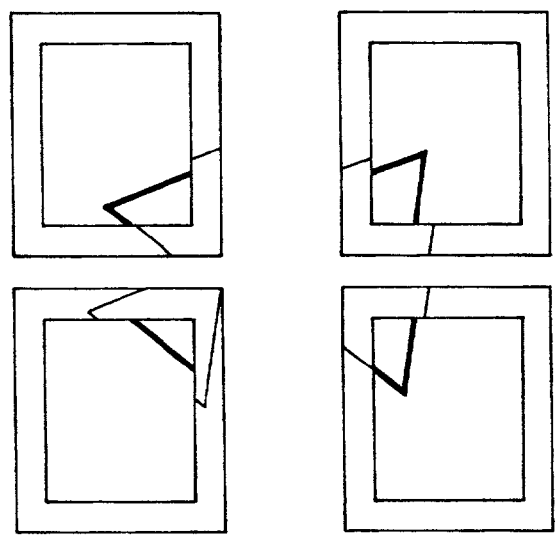
Figure 11C:
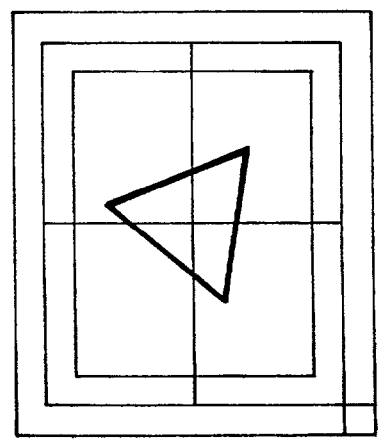

When the shift amounts ($E_{ix}$, $E_{iy}$) of the split images $Q_1'$ to $Q_4'$ are calculated by the error calculating portion 105, as shown in FIG. 11(b), for the image data of the split images $Q_1'$ to $Q_4'$ stored in the memories 110a to 110d, the addresses of the pixel data are converted by the shift amounts ($E_{ix}$, $E_{iy}$), and the address-converted pixel data are again stored in the memories 110a to 110d. Then, as shown in FIG. 11(c), the split images $Q_1'$ to $Q_4'$ are connected into one image of the entire subject.

In doing this, since the detection accuracy of the position detecting portion 70 is equal to the pixel pitch of the image shooting portion 20 as mentioned above, the shifts of the split images are corrected on the order equal to the pixel pitch by the address conversion of the pixel data.

Figure 13:
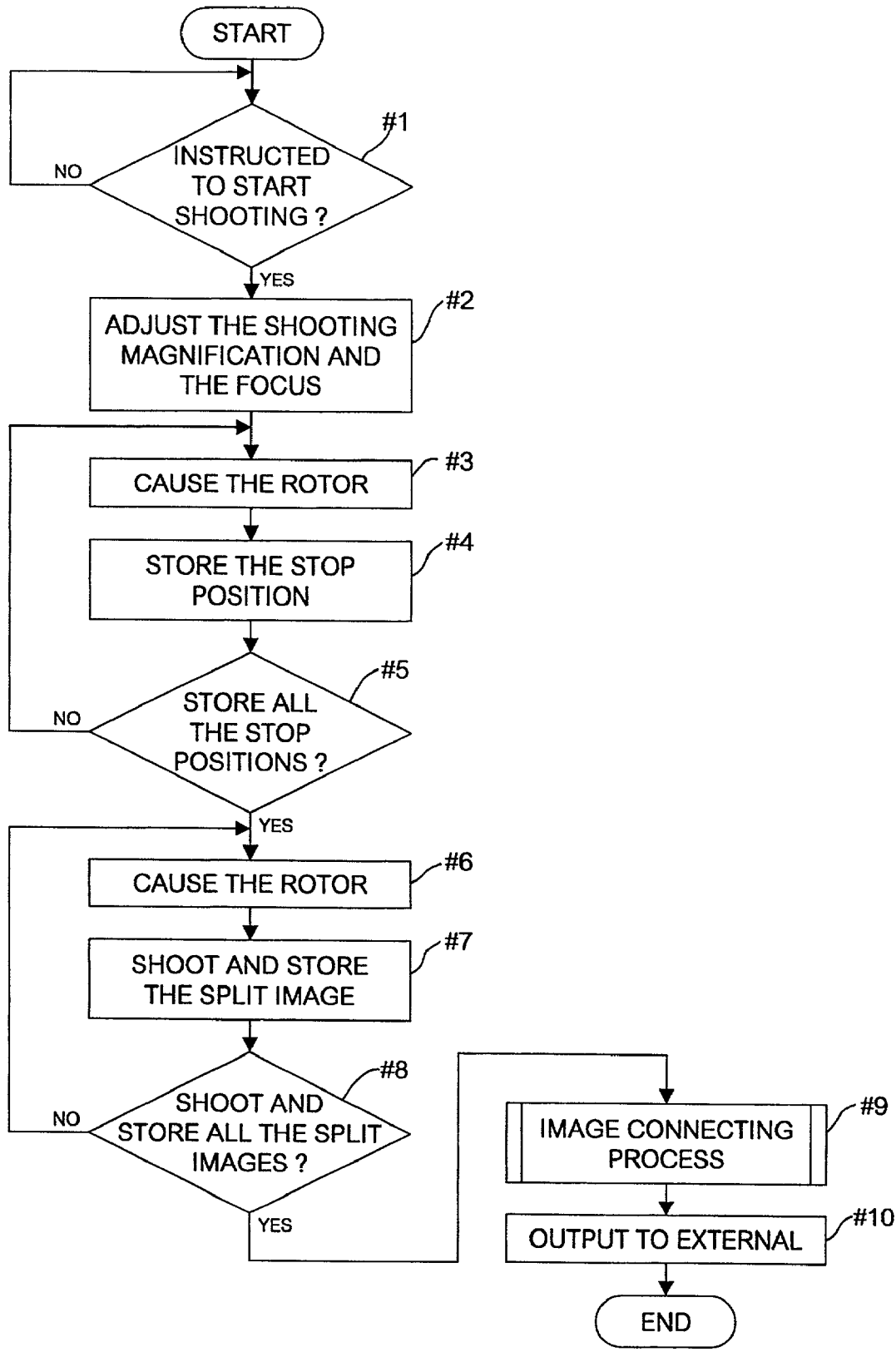
FIG. 13 is a flowchart showing the operation performed by the image shooting apparatus according to the first embodiment.

Next, the image shooting operation performed by the image shooting apparatus 1 will be described with reference to the flowchart of FIG. 13. When the image shooting apparatus 1 is instructed to start shooting by a predetermined start button (step #1), the zoom lens system and the focusing lens system are driven to adjust the shooting magnification and the focus (step #2). Then, the rotor 31 is caused to make one revolution and at this time, the stop positions are stored (steps #3 and #4).

When all the stop positions are stored (step #5), rotation of the rotor 31 for shooting is started (step #6). Then, the image forming portion 10 is stopped at each of the stop positions α to δ, and the split images $Q_1$ to $Q_4$ of the subject are shot and stored (step #7). When shooting of all the split images $Q_1$ to $Q_4$ is finished (YES at step #6), the image connecting processing to connect the split images $Q_1'$ to $Q_4'$ into one image of the entire subject is performed (step #9), and the image is output to a predetermined external apparatus (step #10).

As described above, according to the image shooting apparatus 1 of this embodiment, the stop positions of the image forming portion 10 are detected on the order equal to the pixel pitch, the shift amounts of the shot split images are obtained from the shit amounts of the stop positions of the image forming portion 10, the address is converted to the normal address based on the shift amount for each split image, and then, the split images $Q_1'$ to $Q_4'$ are connected. Consequently, even when the split images $Q_1'$ to $Q_4'$ are shot being shifted, the split images $Q_1'$ and $Q_4'$ can be connected with high accuracy. Moreover, compared to conventional image shooting apparatuses that shoot a predetermined pattern together with the original to align the positions of the split images, the image shooting apparatus of this embodiment does not require a member where the predetermined pattern is drawn, so that it can be avoided that the image shooting apparatus increases in size.

Next, an image shooting apparatus according to a second embodiment of the present invention will be described. The image shooting apparatus according to this embodiment is substantially similar to the image shooting apparatus according to the first embodiment except the image connecting processing. Therefore, only the image connecting processing will be described, and the parts and the processings other than that will not be described.

In the image shooting apparatus according to this embodiment, the detection accuracy of the position detecting portion 70 is greater than the pixel pitch (the position detecting portion 70 performs the detection with a resolution smaller than the pixel pitch). In the case of this structure, even if the shift amounts are calculated based on the value detected by the position detecting portion 70 and the addresses are converted by the shift amounts to connect the split images $Q_1'$ to $Q_4'$ like in the first embodiment, since the calculated shift amounts have errors larger than the pixel pitch, a shift of more than one pixel pitch can remain between the split images $Q_1'$ to $Q_4'$. This image shooting apparatus is characterized in that in order that the split images $Q_1'$ to $Q_4'$ can be connected on the order equal to the pixel pitch even when the detection accuracy of the position detecting portion 70 is greater than the pixel pitch, the split images $Q_1'$ to $Q_4'$ are connected by a method shown below by use of the shift amount $E_i$ calculated based on the value detected by the position detecting portion 70. While in the first embodiment, the overlapping area T is merely for preventing parts of the shot image from missing when the split images are shot being shifted, in this embodiment, the image connecting processing is performed by use of the image data of the overlapping area T.

Figure 14:
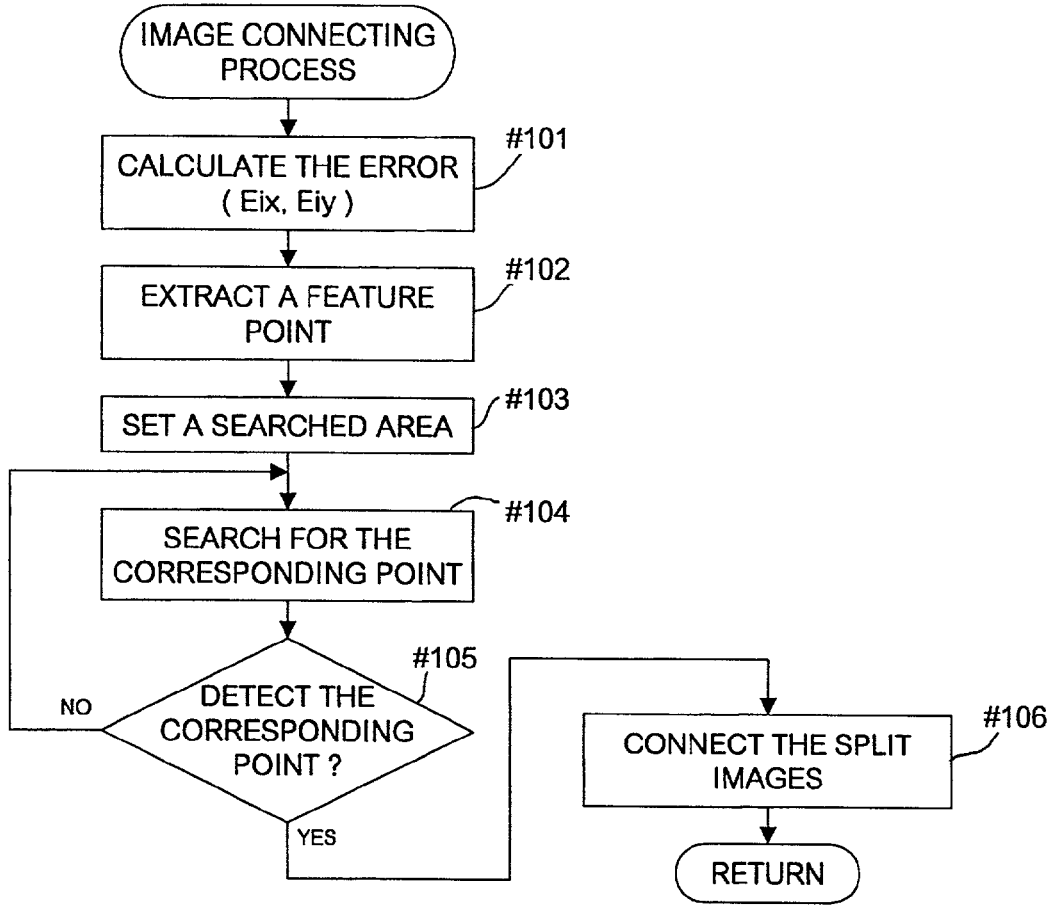
FIG. 14 is a flowchart showing an operation performed by an image shooting apparatus according to a second embodiment.
Figure 15:
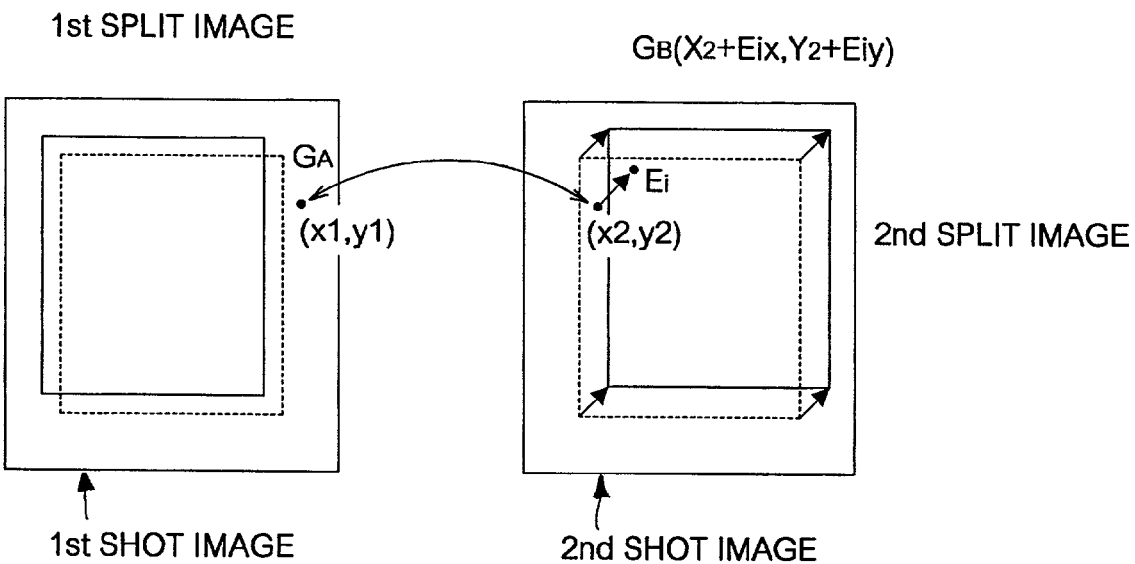
FIG. 15 is a view for explaining an image connecting processing performed by the image shooting apparatus according to the second embodiment.

FIG. 14 is a flowchart showing the image connecting processing performed by the image shooting apparatus according to this embodiment. As shown in FIG. 14, when shooting of the split images $Q_1$ to $Q_4$ is finished, the error $E_{in}$ (hereinafter, referred to shift amount $E_{in}$) of each of the split images $Q_1'$ to $Q_4'$ is calculated (step #101). Then, as shown in FIG. 15, a feature point $G_A$ such as the brightness level difference is extracted from the overlapping area T of a first shot image (step #102).

Here, an area to be searched for a point $G_B$ on a second shot image corresponding to the feature point $G_A$ is limited by use of the calculated shift amount $E_{in}$ (this value has an error as mentioned above). As shown in FIG. 15, the address of the feature point $G_A$ on the first shot image $Q_1$ is ($X_1$, $Y_1$), and the address of the point $G_B$ on the second shot image when the image is shot in the normal position is ($X_2$, $Y_2$). At this time, when the detection accuracy of the position detecting portion 70 is n, since the point $G_B$ is present in a 2n-squre area with the address ($X_2+E_{ix}$, $Y_2+E_{iy}$) as the center, the 2n-square area is set as the area where the feature point $G_B$ is present (step #103).

Figure 16:
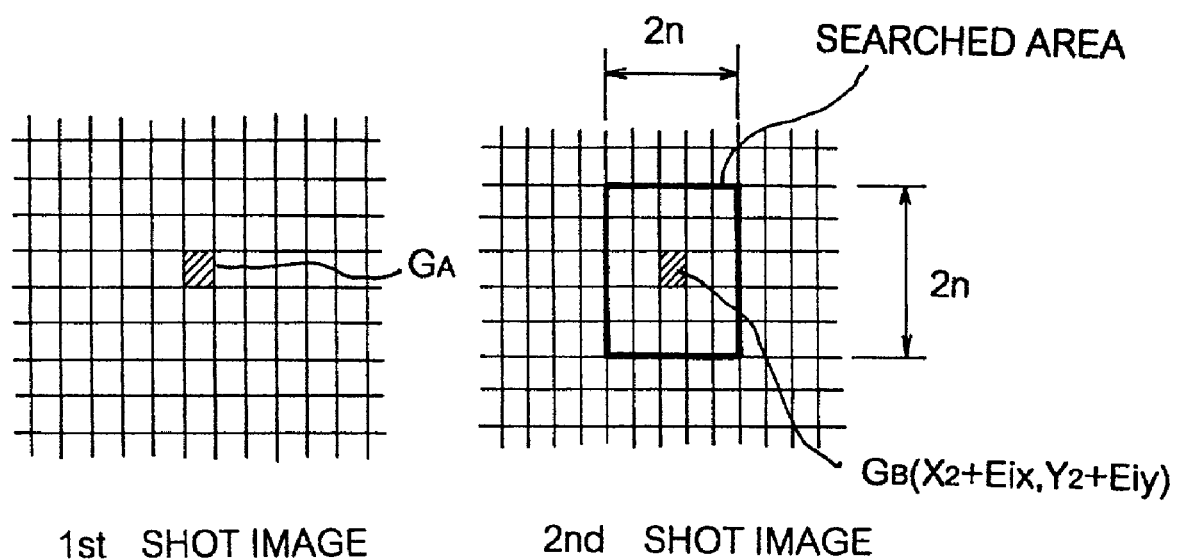
FIG. 16 is a view for explaining the image connecting processing performed by the image shooting apparatus according to the second embodiment.
Figure 17A:
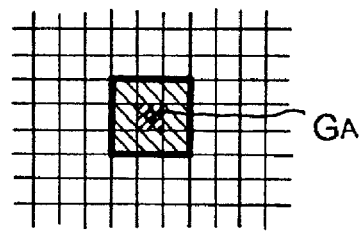
FIGS. 17(a) to (c) are views for explaining the image connecting processing performed by the image shooting apparatus according to the second embodiment.
Figure 17B:
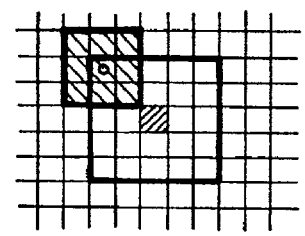
Figure 17C:
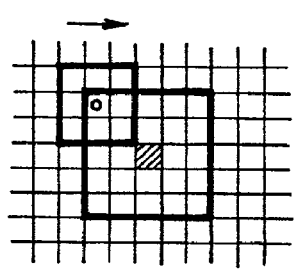
Figure 17C:
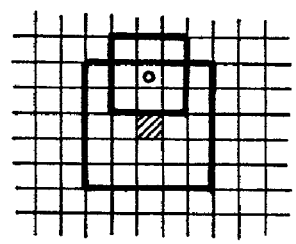
Figure 17C:
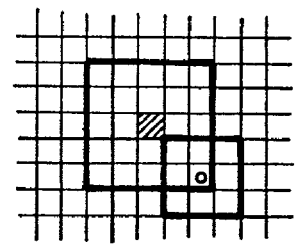
Figure 18A:
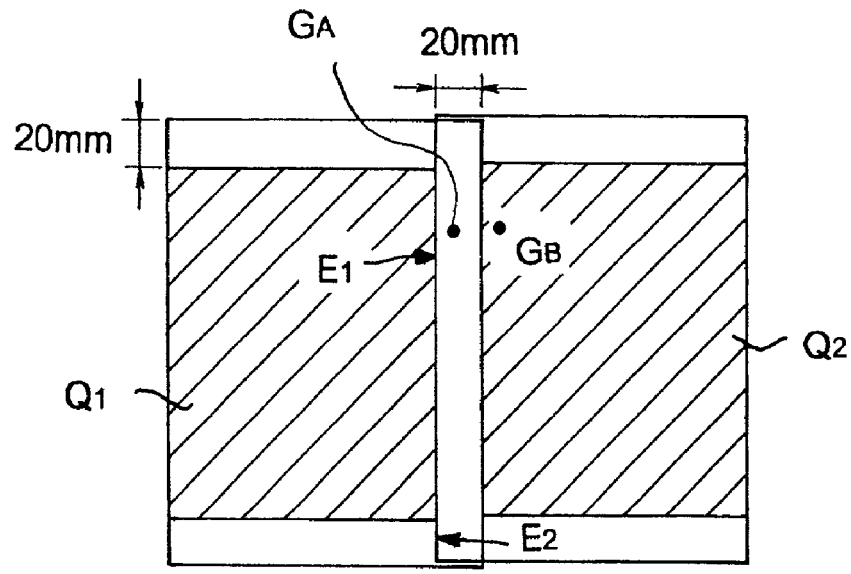
FIGS. 18(a) and 18(b) are views for explaining a problem that arises when the address of the feature point is not estimated.
Figure 18A:
Figure 18B:
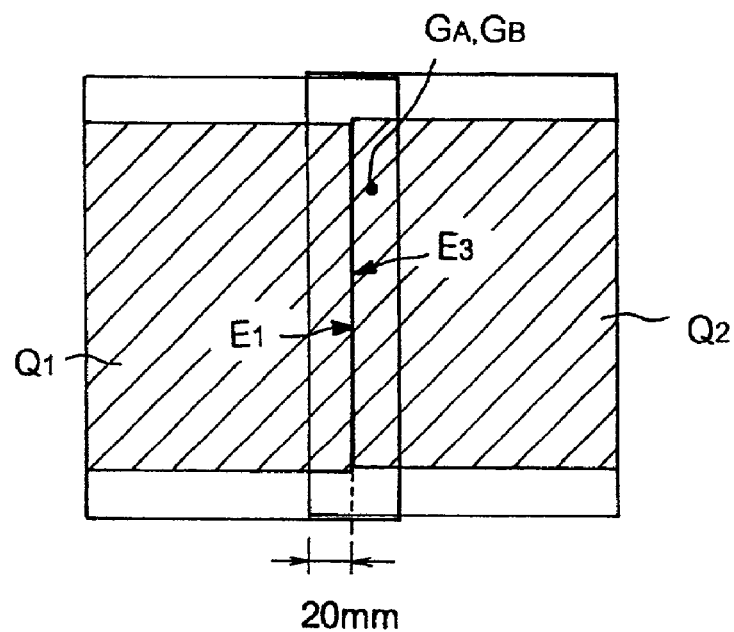

Then, as shown in FIG. 16, the pixels in the 2n-squre area with the address ($X_2+E_{ix}$, $Y_2+E_{iy}$) of the second split image $Q_2'$ as the center are searched for the point corresponding to the feature point $G_A$ by moving from one pixel to another in the x and the y directions (step #104). Specifically, for example, as shown in FIG. 17(b), the pixel at the upper-left corner of the search area of the second shot image is set as a target pixel, and the degree of coincidence between, for example, nine pixels with the target pixel as the center and nine pixels with the feature point $G_A$ in the first shot image as the center as shown in FIG. 17(a) is calculated by a correlation computation. Then, as shown in FIG. 17(c), the pixels in the search area are successively set as a target pixel, the degree of coincidence of the target pixel is calculated, and the pixel with the highest degree of coincidence is regarded as the pixel corresponding to the feature point $G_4$. In FIGS. 16 and 17(a) to 17(c), the smallest squares represent pixels.

Then, after the position shift of the second shot image is corrected based on the relative positional relationship between the shot images, the split images are connected. By performing the above-described processing on the split images $Q_2'$ and $Q_3'$, the split images $Q_3'$ and $Q_4'$, and the split images $Q_4'$ and $Q_1'$; the split images $Q_1'$ to $Q_4'$ are connected into one image of the entire subject (step #106).

By performing the above-described split image connecting processing, the following effect is obtained: When the positions of the split images $Q_1'$ and $Q_2'$ are aligned without the calculation and the use of the errors ($E_{ix}$, $E_{iy}$), it is necessary to perform the search in the following manner: For example, as shown in FIG. 17, when in shooting the split images $Q_1$ and $Q_2$ with a 10-mm-wide overlapping area T on all the sides thereof, the first split image $Q_1'$ is shifted leftward by 10 mm (a 20-mm-wide overlapping area at the right end) and the second split image $Q_2'$ is shifted rightward by 10 mm (a 20-mm-wide overlapping area at the left end) (that is, when the first and the second split images $Q_1'$ and $Q_2'$ are shifted in the opposite directions in the lateral direction of FIG. 17), it is necessary to perform the search while moving in the lateral direction between a condition (a) where the right end part $E_1$ of the first split image $Q_1'$ coincides with the left end part $E_2$ of the second shot image in the lateral direction and a condition (b) where the right end part $E_1$ of the first split image $Q_1'$ coincides with the left end part $E_3$ of the second split image $Q_2'$ in the lateral direction. Therefore, the search area in the lateral direction is 20 mm. Although not shown, like the search area in the lateral direction, the search area in the longitudinal direction when the split images $Q_1'$ and $Q_2'$ are shifted in the opposite directions is 20 mm. Therefore, when the split images are shifted in the opposite directions both in the lateral and the longitudinal directions, it is necessary to search a 20-mm-squre area.

However, by estimating the position of the feature point as described above like in this embodiment, it is necessary to search only the area around the feature point for the feature point and the area to be searched can be limited to a small area, so that it is necessary only to search the limited area for the feature point. For example, when the detection accuracy n of the position detecting portion 70 is 1 mm (>the pixel pitch), the search area is 2×1=2 mm as mentioned above. Therefore, by the image connecting processing of this embodiment, the search area is reduced, in the case of this example, to $(2/20)^2 = 1/100$.

As described above, even when the detection accuracy of the position detecting portion 70 is lower than the pixel pitch, the split images can be connected on the order equal to the pixel pitch while the search area, as well as the processing time, is reduced. Moreover, compared to conventional image shooting apparatuses that shoot a predetermined pattern together with the original to align the positions of the split images, the shooting apparatus of this embodiment does not require a member where the predetermined pattern is drawn, so that it can be avoided that the image shooting apparatus increases in size. Further, when the subject image comprises a plurality of the same patterns (when a plurality of similar feature points is present), it can be avoided that the positions of the split images are erroneously aligned.

The present invention is not limited to the above-described embodiments but the following modifications are adoptable:

(1) While in the above-described embodiments, the position errors $E_i$ of the shot images are calculated by the computing expressions shown above, a table on the position errors $E_i$ with the errors $E_d$ of the stop positions as parameters may be provided. With this, the time required for the computation is shorter than that in the case of the image processing of the first embodiment, so that the processing time can be further reduced.

(2) By increasing the accuracy of the position detecting portion 70 so that the position errors are detected with a resolution smaller than the pixel pitch, assigning a weight to the pixel value according to the degree of overlap of the pixel data and averaging the pixel value for each pixel, the positions of the split images can be aligned on the order smaller than the pixel pitch, so that images with higher quality can be shot. The accuracy of the position detecting portion 70 may be increased, for example, by making finer the pitch of the magnetic poles provided on the magnetic field generating portion 31b or by interpolating the detection value on a sine curve.

(3) The present invention is not limited to apparatuses that shoot the split images while moving the image forming portion 10 relatively to the image shooting portion 20 like the above-described embodiments, but is also applicable, for example, to image shooting apparatuses in which the image shooting portion 20 and the image forming portion 10 are fixedly provided for each of the split images.

(4) While the subject image is scanned by moving the image forming optical system in the above-described embodiments, the present invention is not limited thereto; a structure may be adopted such that by scanning the subject image with a mirror (an example of the scanning means) and changing the area shot by the image shooting portion, a plurality of split parts of the subject image is shot. Moreover, a structure such that the split images are shot by changing the shooting direction by rotating a unit comprising an optical system and an image shooting portion integrated with each other is also adoptable by the present invention. Further, the split images of the subject may be shot by moving the subject with the image shooting portion and the optical system being stationary. That is, it is necessary for the scanning in the present invention only to be one that changes the area, of the subject, shot by the image shooting portion.

(5) While the above-described embodiments are structured so as to perform in the image shooting apparatus a split image pasting processing, that is, a shift amount calculating processing to calculate the shift amount of each split image from the normal image shooting position in the shooting image plane, a position aligning processing to align the positions of the boundary parts of the split images based on the calculated shift amounts, and an image connecting processing to connect the position-aligned split images by pasting them together at the boundary parts, the present invention may be structured so that the split images and the stop position information are output to an external apparatus such as a personal computer and the split images are pasted together by the external apparatus. In this case, for example, information on the shift of the relative positions of the image shooting means and the image forming means is detected in the image shooting apparatus, a program to perform the pasting processing by use of the information is recorded on a recording medium such as a CD-ROM, and the external apparatus reads the program from the recording medium and performs the pasting processing.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method for shooting an original by an image shooting apparatus having a photoelectrically converting device and a scanning mechanism disposed from a support adapted to establish a reference position of the scanning mechanism relative to the original, said method comprising the steps of:
    directing one by one split images of the original including overlapping areas to the photoelectrically converting device by operations of the scanning mechanism;
    shooting the directed split images by the photoelectrically converting device;
    detecting a difference between an actual stop position of the scanning mechanism and a normal stop position when shooting a split image;
    converting an address of each split image to a normal address based on the detected difference for each split image; and
    connecting each split image in order to complete an image of the original based on the converted normal address of each split image,
    wherein said operations of the scanning mechanism move an image forming portion so as to change the position of the image forming portion relative to the photoelectrically converting device.

2. A method according to claim 1, wherein the operation of the scanning mechanism for directing one by one the split images to the photoelectrically converting device is moving an optical system disposed between the photoelectrically converting device and the original.

3. A method according to claim 1, wherein said scanning mechanism moves the image forming portion in a direction perpendicular to an optical axis of the image forming portion.

4. A method according to claim 1, wherein a locus of movement of the image forming portion is circular.

5. A method according to claim 1, wherein motion of the image forming portion corresponds to the base of a cone having an apex at the photoelectrically converting device.

6. A method according to claim 1, wherein
    said actual stop position of the scanning mechanism is detected with resolution on the order of the pixel pitch of the photoelectrically converting device.

7. A method for connecting split images of an original to obtain an image of the entire original, said method comprising the steps of:
    placing the original in a reference position such that the original has a predetermined location and orientation relative to an image shooting device;
    obtaining split images of the original one by one by an operation to change which part of the original is directed to the image shooting device;
    detecting an amount by which each actual stop position of the scanning mechanism is shifted from a normal stop position of the scanning mechanism; and
    connecting the split images responsive to the detected shift amounts,
    wherein the operation to change which part of the original is directed to the image shooting device comprises moving an image forming portion so as to change the position of the image forming portion relative to the image shooting device.

8. A method according to claim 7, wherein the obtained split images each include an overlapping area, and the split images are connected at connection points for which an area marked off from the overlapping area is searched based on the detected shift amounts.

9. A method according to claim 7, wherein the step of calculating a shift between split images based on the detected shift amounts is further included, and the split images are connected together based on the calculated shift.

10. A method according to claim 7, wherein the image of the entire original comprises the split images arranged in longitudinal and lateral directions.

11. A method according to claim 7, wherein motion of the image forming portion is on the base of a cone having an apex at the image shooting portion.

12. A method according to claim 7, wherein
    said actual stop position of the scanning mechanism is detected with a resolution on the order of the pixel pitch of the photoelectrically converting device.

13. An image shooting apparatus comprising:
    an image shooting device which shoots an optical image of an original;
    a directing member which directs split images of the optical image of the original to the image shooting apparatus;
    a registration member for providing a reference position and orientation of the original relative to the directing member;
    a mechanism which, in order to scan the entire original, changes which part of the original is directed to the image shooting apparatus by moving at least the directing member relative to the image shooting device;
    a detector which detects, every time the mechanism moves the directing member, a difference between an actual stop position of the directing member and a normal position of the directing member; and
    a processor which connects the split images in consideration of the detected difference to thereby complete an image of the entire original.

14. An image shooting apparatus according to claim 13, wherein
    the directing member includes a lens system that forms the split images on the image shooting device, and
    the mechanism moves the lens system to form the split images on the image shooting device.

15. An image shooting apparatus according to claim 13, wherein
    a resolution of the detector is lower than a resolution of image shooting, and
    the processor performs the steps of:
        searching an area defined in a second split image based on the detected difference for a second point present in the second split image which second point corresponds to a first point present in a first split image; and
        connecting the first split image and the second split image together so that the first point and the corresponding second point coincide with each other.

16. A method according to claim 13, wherein the mechanism moves the directing member in a direction perpendicular to an optical axis of the image shooting device.

17. A method according to claim 13, wherein a locus of movement of the directing member is circular.

18. A method according to claim 13, wherein the mechanism moves the directing member on the base of a cone having an apex at the image shooting portion.

19. An image shooting apparatus according to claim 13, further comprising:

converter for converting an address of the split image to a normal address based on the shift amount for each split image, wherein the processor connects the split images based on the converted normal address of each split image.

20. A method according to claim 13, wherein
said actual stop position of the scanning mechanism is detected with a resolution on the order of the pixel pitch of the photoelectrically converting device.

* * * * *

UNITED STATES PATENT AND TRADEMARK OFFICE
CERTIFICATE OF CORRECTION

PATENT NO. : 7,184,091 B2 Page 1 of 1
APPLICATION NO. : 09/981700
DATED : February 27, 2007
INVENTOR(S) : Shinya Matsuda et al.

It is certified that error appears in the above-identified patent and that said Letters Patent is hereby corrected as shown below:

Column 11:
Line 64, Claim 7, delete "the scanning mechanism" and insert -- a scanning mechanism --.

Column 12:
Line 21, Claim 11, delete "shooting portion." and insert -- shooting device. --.
Line 25, Claim 12, delete "photoelectrically converting" and insert -- image shooting --.

Column 13:
Line 9, Claim 18, delete "shooting portion." and insert -- shooting device. --.

Column 14:
Lines 2-3, Claim 19, delete "the shift amount for each split image, wherein," and insert -- a shift amount for each split image detected by the detector, wherein --.
Line 9 Claim 18, delete "photoelectrically converting" and insert -- image shooting --.

Signed and Sealed this

Twenty-fifth Day of December, 2007

JON W. DUDAS
*Director of the United States Patent and Trademark Office*